(12) United States Patent
Christian et al.

(10) Patent No.: US 10,285,057 B2
(45) Date of Patent: *May 7, 2019

(54) LOGICAL SUBSCRIBER IDENTIFICATION MODULE (SIM)

(71) Applicant: International Business Machines Corporation, Armonk, NY (US)

(72) Inventors: Susan J. Christian, Grapevine, TX (US); Alan D. Emery, North Richland Hills, TX (US); Arvind Sathi, Englewood, CO (US); Fernando M. Siqueira, São Paulo (BR); Mathews Thomas, Flower Mound, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,185

(22) Filed: Jul. 18, 2018

(65) Prior Publication Data

US 2018/0324588 A1   Nov. 8, 2018

Related U.S. Application Data

(63) Continuation of application No. 15/602,977, filed on May 23, 2017, now Pat. No. 10,057,771, which is a
(Continued)

(51) Int. Cl.
  *H04M 1/66* (2006.01)
  *H04M 1/68* (2006.01)
  (Continued)

(52) U.S. Cl.
  CPC ............ *H04W 12/06* (2013.01); *G06F 3/048* (2013.01); *G06F 17/212* (2013.01);
  (Continued)

(58) Field of Classification Search
  CPC ...... H04W 12/06; H04W 8/183; G06F 17/212
  (Continued)

(56) References Cited

U.S. PATENT DOCUMENTS 8,200,736 B2    6/2012  Shi et al.
8,577,355 B1 *  11/2013 Shaw .................. H04L 67/2823
                                                          455/41.2
(Continued)

OTHER PUBLICATIONS

IBM: List of IBM Patents or Patent Applications Treated as Related, 2 pg.
(Continued)

*Primary Examiner* — Marceau Milford
(74) *Attorney, Agent, or Firm* — Cuenot, Forsythe & Kim, LLC

(57) ABSTRACT

A mobile hub can receive from a mobile device a request to authenticate a user of the mobile device with the mobile hub. Responsive to receiving the request, a user profile of the user stored on the mobile hub can be identified. A first of a plurality of mobile networks indicated in the user profile as being available to the user can be identified. The first mobile network can satisfy at least one user specified criterion associated with the user profile. A subscriber authentication associated with the user profile can be selected. The subscriber authentication can be configured to authenticate the user with the first of the plurality of mobile networks and configured to be processed by the first mobile device to automatically establish presence on the first mobile network. The subscriber authentication can be communicated to the mobile device.

20 Claims, 4 Drawing Sheets

Related U.S. Application Data continuation of application No. 14/933,776, filed on Nov. 5, 2015, now Pat. No. 9,693,229.

(51) Int. Cl.

| | |
|---|---|
| *H04M 3/16* | (2006.01) |
| *H04W 12/06* | (2009.01) |
| *H04W 8/18* | (2009.01) |
| *G06F 17/21* | (2006.01) |
| *G06F 3/048* | (2013.01) |
| *H04L 29/06* | (2006.01) |
| *H04W 48/18* | (2009.01) |

(52) U.S. Cl.
CPC ........... *H04L 63/205* (2013.01); *H04W 8/183* (2013.01); *H04W 48/18* (2013.01)

(58) Field of Classification Search
USPC .......... 455/411, 435.1, 509, 466, 556.1, 433
See application file for complete search history.

(56) References Cited

U.S. PATENT DOCUMENTS

| | | | | |
|---|---|---|---|---|
| 8,630,635 | B2* | 1/2014 | Tysowski | H04M 1/7253 380/247 |
| 8,634,828 | B2 | 1/2014 | Shi et al. | |
| 8,843,105 | B2* | 9/2014 | Fan | H04W 72/048 455/404.1 |
| 8,989,698 | B2* | 3/2015 | Fan | H04W 4/02 455/404.1 |
| 9,185,642 | B2 | 11/2015 | Komiya | |
| 9,451,098 | B2* | 9/2016 | Zhu | H04M 15/49 |
| 9,563,986 | B2* | 2/2017 | Cattone | G07C 5/008 |
| 9,685,067 | B2* | 6/2017 | Shaw | H04W 4/90 |
| 9,693,229 | B2* | 6/2017 | Christian | H04W 12/06 |
| 2003/0009385 | A1 | 1/2003 | Tucciarone et al. | |
| 2004/0203901 | A1 | 10/2004 | Wilson et al. | |
| 2006/0253894 | A1 | 11/2006 | Bookman | |
| 2010/0248690 | A1 | 9/2010 | Biggs et al. | |
| 2010/0311391 | A1 | 12/2010 | Siu et al. | |
| 2010/0311402 | A1* | 12/2010 | Srinivasan | H04W 8/183 455/418 |
| 2010/0311404 | A1 | 12/2010 | Shi et al. | |
| 2011/0028135 | A1 | 2/2011 | Srinivasan | |
| 2011/0059738 | A1 | 3/2011 | Waller | |
| 2011/0306318 | A1 | 12/2011 | Rodgers et al. | |
| 2012/0108206 | A1 | 5/2012 | Haggerty | |
| 2013/0331096 | A1 | 12/2013 | Rogan | |
| 2014/0155017 | A1* | 6/2014 | Fan | H04W 4/02 455/404.1 |
| 2015/0295726 | A1* | 10/2015 | Bland | H04L 12/189 709/203 |
| 2015/0304506 | A1 | 10/2015 | Zhu et al. | |
| 2016/0240721 | A1* | 8/2016 | Chu | A61B 5/14552 |
| 2017/0134944 | A1 | 5/2017 | Christian et al. | |
| 2017/0257763 | A1* | 9/2017 | Christian | H04W 12/06 |

OTHER PUBLICATIONS

Christian, S.J. et al., "Logical Subscriber Identification Module (SIM)," U.S. Appl. No. 14/966,776, filed Nov. 5, 2015, 42 pages.
Christian, S.J. et al., "Logical Subscriber Identification Module (SIM)," U.S. Appl. No. 15/602,977, filed May 23, 2017, 42 pages.

* cited by examiner

LOGICAL SUBSCRIBER IDENTIFICATION MODULE (SIM)

BACKGROUND

The present invention relates to mobile communications.

A conventional subscriber identification module (SIM) is an integrated circuit chip configured to securely store an international mobile subscriber identity (IMSI) number and its related authentication key, which are used to identify and authenticate subscribers on mobile telephony devices (such as mobile phones, smart phones, and certain mobile computers). A conventional SIM also stores a unique serial number, security authentication and ciphering information, temporary network-specific information related to a mobile network, a list of services a user may access, and two passwords; a personal identification number for ordinary use and a personal unblocking code for PIN unlocking. A conventional SIM is integrated into a universal integrated circuit card (UICC), oftentimes referred to as a SIM card.

The network-specific information is used by mobile telephony devices to authenticate a subscriber on a mobile network. This information also can include carrier-specific data, such as a short message service center (SMSC) number, a service provider name (SPN), service dialing numbers (SDN), advice-of-change parameters and value added service (VAS) applications.

SIM cards generally are a required component of mobile phones configured to connect to Global System for Mobile Communications (GSM) mobile networks and code division multiple access (CDMA) networks implementing the Long-Term Evolution (LTE) standard. SIM cards, however, typically are removable and can be transferred from one mobile phone to another, for example when a user upgrades to a new mobile phone. Because the SIM card stores the IMSI number assigned to the user and the network-specific information, the user is able to begin using the new mobile phone without having to create new authentication credentials. The new phone, however, still must be pre-configured to operate in accordance with the communication protocols used by the mobile carrier.

SIM cards, however, typically are network/carrier specific. Thus, a user usually is limited to using a single mobile carrier. If the user desires to change mobile carriers and use the same mobile phone, the user typically will need to replace the SIM card in the mobile phone. This process can be cumbersome if the user has accounts with multiple mobile carriers, in which case the user must carry a SIM card for each carrier and is tasked with changing the SIM card each time the user chooses to change mobile carriers.

U.S. Pat. No. 8,634,828 discloses "a virtual SIM (VSIM) card which may be contained as part of the mobile device's internal memory" and "provisioning data for multiple service providers may be stored within a VSIM and may be selectively enabled and disabled according to user defined profiles." That disclosure, however, is centric to use of a single mobile device by a particular user, and does not address challenges that are presented in situations in which a user may use multiple different mobile devices.

SUMMARY

A system includes a processor programmed to initiate executable operations. The executable operations include receiving, by a mobile hub, from a first mobile device a first request to authenticate a user of the first mobile device with the mobile hub. The executable operations also can include, responsive to receiving the first request, identifying at least a first user profile of the user stored on the mobile hub. The executable operations also can include also can include, responsive to identifying the first user profile of the user, identifying a first of a plurality of mobile networks indicated in the first user profile as being available to the user, the first mobile network satisfying at least a first user specified criterion associated with the first user profile. The executable operations also can include also can include, responsive to identifying the first of the plurality of mobile networks that satisfies the first user specified criterion, selecting a first subscriber authentication associated with the first user profile, the first subscriber authentication configured to authenticate the user with the first of the plurality of mobile networks and configured to be processed by the first mobile device to automatically establish presence on the first mobile network. The executable operations also can include, communicating to the first mobile device the first subscriber authentication.

A computer program includes a computer readable storage medium having program code stored thereon. The program code is executable by a processor to perform a method. The method includes receiving, by a mobile hub executed by a processor, from a first mobile device a first request to authenticate a user of the first mobile device with the mobile hub. The method also can include, responsive to receiving the first request, identifying, by the processor, at least a first user profile of the user stored on the mobile hub. The method also can include, responsive to identifying the first user profile of the user, identifying, by the processor, a first of a plurality of mobile networks indicated in the first user profile as being available to the user, the first mobile network satisfying at least a first user specified criterion associated with the first user profile. The method also can include, responsive to identifying the first of the plurality of mobile networks that satisfies the first user specified criterion, selecting, by the processor, a first subscriber authentication associated with the first user profile, the first subscriber authentication configured to authenticate the user with the first of the plurality of mobile networks and configured to be processed by the first mobile device to automatically establish presence on the first mobile network. The method also can include, communicating, by the processor, to the first mobile device the first subscriber authentication.

In another arrangement, a computer program includes a computer readable storage medium having program code stored thereon. The program code is executable by a processor to perform a method. The method includes communicating, by a mobile device comprising at least one processor, to a first mobile hub a request to authenticate a user of the mobile device with the first mobile hub. The method also can include, responsive to communicating the request, receiving, by the mobile device a subscriber authentication associated with a user profile of the user stored on the mobile hub, the subscriber authentication configured to authenticate the user with a first of a plurality of mobile networks indicated in the user profile as being available to the user, the first mobile network satisfying at least a first user specified criterion associated with the user profile. The method also can include, responsive to receiving, by the mobile device, the subscriber authentication, automatically establishing, by the mobile device, presence on the first mobile network using the first subscriber authentication.

DETAILED DESCRIPTION

Figure 1:
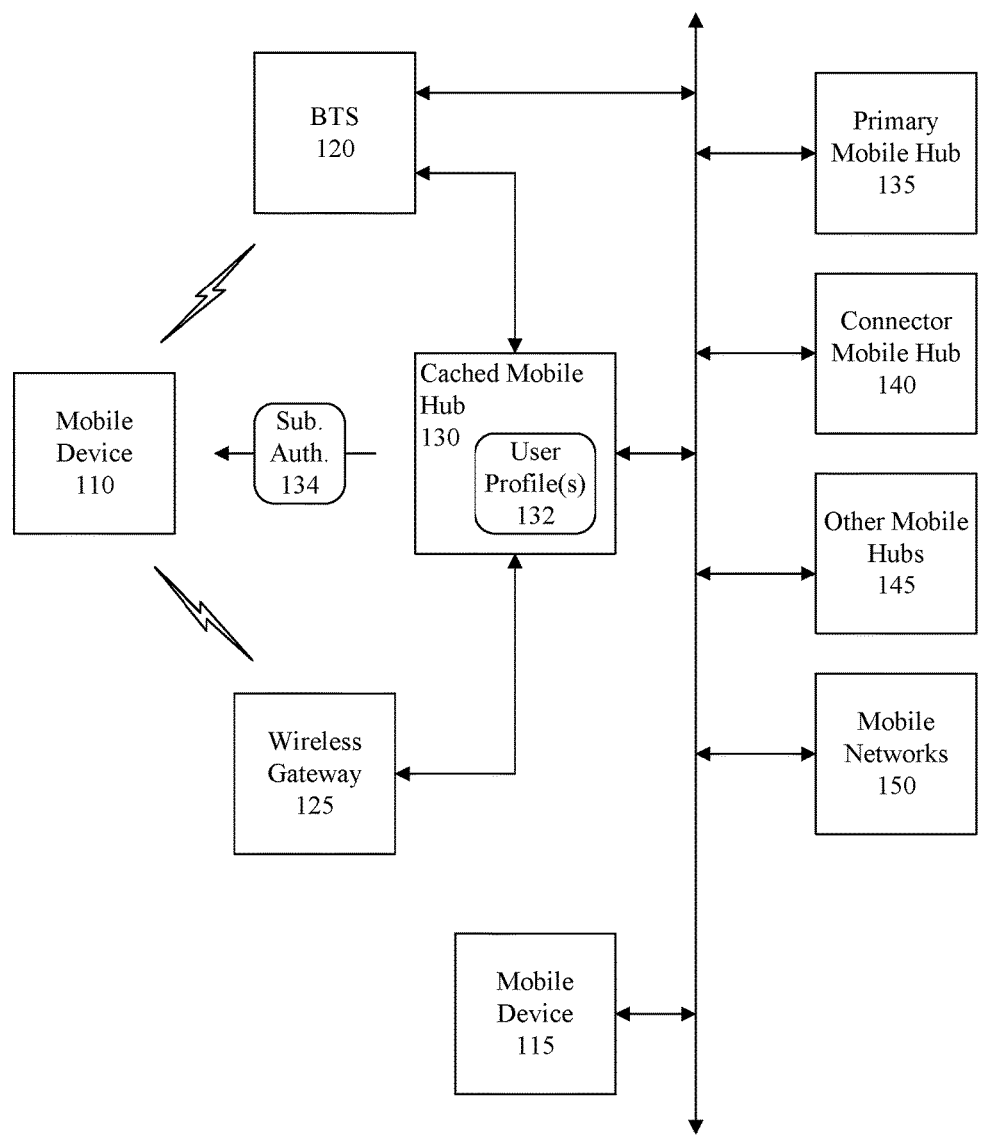
FIG. 1 is a block diagram illustrating an example of a communication system.

The present invention relates to mobile communications. In accordance with the inventive arrangements disclosed herein, a user may use different mobile devices, but regardless of which mobile device the user currently is using, the user can access the mobile network(s) he normally uses without changing out subscriber identification module (SIM) cards on the mobile devices. Moreover, the user can be presented the same applications, including the same application configurations and data, as well as the same user interface layout, presented on other mobile devices used by the user. Thus, the user can seamlessly transition from using one mobile device to another without having to re-learn where various icons, menus, etc. are located, and without having to reconfigure applications, recreate data, etc. By way of example, if a user inadvertently leaves his/her mobile device at home when heading to the airport, the user can purchase a new mobile device at the airport and access a mobile hub to have the new mobile device automatically configured in accordance with the user's profile.

Further, the user can specify criterion relating to which mobile networks the user prefers to use, for example based on price, quality of service (QoS), level of security required, etc. Based on such criterion, the mobile hub can select the appropriate mobile network for the user to use, and communicate to the mobile device a subscriber authentication, assigned to the user, for the mobile device to use. Responsive to receiving the subscriber authentication, the mobile device can automatically establish presence on the selected mobile network. Also, the mobile hub can monitor communications communicated between the mobile device and the mobile network. If the communications do not satisfy user specified criterion, the mobile hub can automatically select another mobile network and communicate to the mobile device a subscriber authentication assigned to the user for the other mobile network. Again, responsive to receiving the new subscriber authentication, the mobile device can automatically establish presence on the newly selected mobile network.

In illustration, assume the user initially is only using voice communications over a first, low bandwidth and low price, mobile network. At some point, the user may begin browsing the Internet, but the bandwidth provided by the first mobile network may be insufficient for the user to have a smooth web browsing experience. The mobile hub can detect such condition, and select a faster, and perhaps higher price, mobile network for the mobile device to connect to, and initiate such connection by communicating to the mobile device a new subscriber authentication. Accordingly, the present arrangements can optimize the user's experience using the mobile device.

Several definitions that apply throughout this document now will be presented.

As defined herein, the term "mobile device" means a processing system, including at least one processor, memory and at least one transceiver, that is configured to transmit and receive wireless communication signals via one or more mobile networks and used by a user at least for mobile telephony communication over the one or more mobile networks. A mobile device also can be configured to be used by a user for other types of data communication via one or more mobile networks, for example communications with the Internet of Things (IoT). Examples of a "mobile device" include, but are not limited to, a smart phone, a cellular telephone, a personal digital assistant, a mobile computer, a laptop computer, a netbook computer, a tablet computer, an embedded processing device (e.g., an IoT device), and the like. Network infrastructure, such as routers, firewalls, switches, access points, servers and the like, are not mobile devices as the term "mobile device" is defined herein, regardless of whether such network infrastructure is configured to be mobile.

As defined herein, the term "mobile network" means a communication network providing wireless communication links to mobile devices. One example of a "mobile network" is a cellular communication network. Another example is a TCP/IP network having nodes that are wireless gateways. Examples of wireless gateways include, but are not limited to, wireless access points, wireless routers, and the like. The wireless gateways can be wireless local area network (LAN) gateways, wireless wide area network (WAN) gateways, Mesh gateways, Broadband Wireless Access gateways, and/or the like. A mobile network 150 may include, in addition to wireless communication links, connections such as wire or fiber optic cables.

As defined herein, the term "establish presence" means to authenticate a mobile device with a mobile network wherein, responsive to the authentication, the mobile device is able to send and receive communications over the mobile network. For example, after authenticating with a mobile network, a mobile device can place calls over the mobile network, and calls placed to the mobile device can be routed by the mobile network to the mobile device. Further, after authenticating with a mobile network, a mobile device can access other networks, for instance the Internet, via the mobile network.

As defined herein, the term "mobile hub" means an application executed by a processing system, including at least one processor and memory, configured to store user profiles and perform various operations in accordance with the user profiles responsive to users authenticating with the processing system. A "mobile hub" can be a "cached mobile hub", a "primary mobile hub" or a "connector mobile hub". A "cached mobile hub" can be cached to local memory in a processing system to provide fast performance, and can make initial determinations as to which mobile networks are to be used by mobile devices, applications to be exposed to the mobile devices, etc. A "primary mobile hub" can store the applications to be exposed to the mobile devices, provide permanent storage of user profiles and other data, and provide other services to the mobile devices. A "connector mobile hub" can receive user requests to use a particular mobile hub desired by the user, and connect the user's mobile device to the requested mobile hub. Components of a primary mobile hub and connector mobile hub can be cached to local memory in a processing as needed to execute processes described herein performed by the primary mobile hub.

As defined herein, the term "user profile" means information stored for a user. A user profile can store, among other things, a plurality of subscriber authentications for a user, information identifying applications used by the user, data and configuration settings for the applications, user interface layout information, and various user preferences.

As defined herein, the term "subscriber authentication" means data used to authenticate a user on a mobile network. A subscriber authentication can include, for example, an international mobile subscriber identity (IMSI) number and its related authentication, key security authentication and ciphering information, network-specific information related to a mobile network, a list of services a user may access, a personal identification number, a personal unblocking code for PIN unlocking, and/or the like.

As defined herein, the term "user interface layout information" means information that defines which icons, menu items, and the like are presented in a user interface, and how the which icons, menu items, and the like are presented. In illustration, a user interface may include multiple panes. The "user interface layout information" can define which icons, menu items, and the like are presented in each pane, and where in each pane these elements are presented. The "user interface layout information" is configured to be processed by one or more mobile devices to present on their respective displays the user interface layout defined by the user interface layout information.

As defined herein, the term "request" means a message in the form of one or more data packets or data frames transmitted over a communication network from one processing system to another processing system.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a communication system (hereinafter "system") 100. The system 100 can include a mobile device 110, a base transceiver station (BTS) 120 and/or a wireless gateway 125, a cached mobile hub 130, a primary mobile hub 135, a connector mobile hub 140 and other mobile hubs 145. The system also can include a plurality of mobile networks 150 managed by mobile service providers.

The mobile device 110 can be pre-configured with a default configuration that detects one or more cached mobile hubs, such as the cached mobile hub 130, for example based on a beacon signal transmitted by the cached mobile hub 130 via the BTS 120 and/or the wireless gateway 125. Further, the mobile device also can be pre-configured to automatically connect to the cached mobile hub 130 responsive to detecting the beacon signal. In the case that the mobile device 110 connects to the cached mobile hub 130 via the BTS 120, the BTS 120 can be configured to communicate requests from anonymous devices, such as the mobile device 110, to the cached mobile hub 130, and the mobile device 110 can be configured to communicate with BTSs configured in this manner. In the case that the mobile device 110 connects to the cached mobile hub 130 via the wireless gateway, the mobile device 110 can connect to the wireless gateway in a conventional manner. For example, the wireless gateway 125 and the mobile device 110 each can be configured to communicate using one or more IEEE 802 wireless communication protocols (e.g., 802.11, 802.16, 802.20 or the like), and the wireless gateway 125 can assign to the mobile device 110 an IP address in a subnet to which the wireless gateway 125 belongs, as is well known in the art. Responsive to connecting to the cached mobile hub 130, the mobile device 110 can communicate at least one request, via the BTS 120 or the wireless gateway 125, to the cached mobile hub 130 to authenticate the mobile device 110 with the cached mobile hub 130. For example, the request(s) can include a user name and password, or other authentication credentials assigned to the user to authenticate with mobile hubs.

As noted, the system 100 can include other mobile hubs 145, some of which may be other cached mobile hubs, each of which may store, or otherwise have access to, the user profile 132 assigned to the user. The cached mobile hub 130 can be one cached on a processing system closes in proximity to the user, which can result in low latency and high bandwidth communication between the mobile device 110 and the cached mobile hub 130. For example, if the user is in an airport, the cached mobile hub 130 can be hosted by a processing system located within the airport, though the present arrangements are not limited in this regard. In an arrangement in which there are a plurality of cached mobile hubs available that each are located within a particular distance from the mobile device 110, the mobile device 110 can automatically ping each of the cached mobile hubs to determine the available latency/bandwidth, and choose the cached mobile hub providing the lowest latency and/or highest bandwidth. In another arrangement, the mobile device 110 can, via a user interface, prompt the user to choose a cached mobile hub from among the available cached mobile hubs.

In another aspect of the present arrangements, the mobile device 110 can initially connect the connector mobile hub 140 in a manner similar to that described above. The connector mobile hub 140 can serve as a mediator hub which communicates to the mobile device 110 information that enables the user or the mobile device 110 to identify the best cached mobile hub 130 for a given activity at a given point in time. Based on this information, the mobile device 110 can select the cached mobile hub 130 and connect to the cached mobile hub 130. It should be noted that the connector mobile hub 140 also can communicate to the mobile device 110 information indicating the primary mobile hub 135 and other mobile hubs 145 available to the mobile device 110, and services provided by such mobile hubs 135, 145. The mobile device 110 can use this information to access the primary mobile hub 135 and other mobile hubs 145 once it is authenticated by the cached mobile hub 130.

Regardless of how the mobile device 110 initially connects to the cached mobile hub 130, responsive to receiving the request(s) from the mobile device 110, the cached mobile hub 130 can authenticate the user of the mobile device 110 and identify a user profile 132 of the user. The user profile 132 can be maintained in the cached mobile hub 130, or the cached mobile hub 130 can access the user profile 132 from the primary mobile hub 135. As noted, the user profile 132 can store, among other things, a plurality of subscriber authentications for the user of the mobile device 110, information identifying one or more applications used by the user, data and configuration settings for the application(s), user interface layout information, and various user preferences.

Responsive to identifying the user profile 132, the cached mobile hub 130 can access the user profile 132. From the user profile 132 the cached mobile hub 130 can identify user preferences. The user preferences can include user specified criteria for selecting mobile networks 150 for use by the mobile device 110. The user criteria can specify, for example, that a lowest price mobile network 150 is to be used, a highest performance mobile network 150 is to be used, a level of QoS preferred by the user, or certain conditions, such as security levels, to be present in order to select a particular mobile network 150. Based on at least one user specified criterion, the cached mobile hub 130 can automatically identify a mobile network 150, for which the user profile 132 includes a subscriber authentication, to be used by the mobile device 110.

In one optional arrangement, the user can, via the mobile device 110, communicate information to the cached mobile hub 130 indicating a mobile network 150 preference. For example, the mobile device 110 can present to the user, via a display of the mobile device 110, a menu of mobile networks 150 available for use by the user/mobile device 110 (e.g., a list of mobile networks 150 for which the user profile 132 includes subscriber authentications). From that menu the user can choose to which mobile network 150 the user desires the mobile device 110 to be connected.

The menu also can indicate various performance parameters of the respective mobile networks 150, or indicate the type of communication for which the respective mobile networks 150 may be optimized. In illustration, if a first mobile network 150 is inexpensive to use and provides relatively low QoS (e.g., level of bandwidth), but a level of QoS is suitable for normal telephone calls, the menu can indicate such. If a second mobile network 150 more expensive to use and provides a better QoS (e.g., low latency, lower error rate, etc.), which may be desirable for very important telephone calls, the menu can indicate such. If a third mobile network 150 is even more expensive and provides another level of QoS (e.g., high bandwidth, low latency, etc.), which may be desirable for Internet browsing, accessing websites/web portals, and placing or receiving important calls, the menu can indicate such. Thus, if the user only needs to use the mobile device 110 for normal calls, the user can choose the first mobile network 150. If the user is expecting to place or receive a very important call, the user can choose the second mobile network 150 or the third mobile network 150. If the user is expecting to use the mobile device for Internet browsing, the user can choose the third mobile network 150. Thus, the user can choose the mobile network 150 that is best suited for the user's intended use and budget.

Responsive to the cached mobile hub 130 or the user selecting a mobile network 150, the cached mobile hub 130 can select, from the user profile 132, a subscriber authentication 134 assigned to the user for use by the user's mobile device 110 to establish presence on the selected mobile network 150. As noted, the subscriber authentication 134 can include, for example, an IMSI number and its related authentication, key security authentication and ciphering information, network-specific information related to a mobile network, a list of services a user may access, a personal identification number, a personal unblocking code for PIN unlocking, and/or the like. The cached mobile hub 130 can communicate the subscriber authentication to the mobile device 110, which can store the subscriber authentication to one or more memory elements within the mobile device 110. Responsive to receiving the subscriber authentication 134, the mobile device 110 can automatically connect to and use the subscriber authentication 134 to authenticate with and establish presence on the selected mobile network 150.

Further, responsive to identifying and accessing the user profile 132, the cached mobile hub 130 can select, based on the user profile 132, user interface layout information associated with the user profile 132. The cached mobile hub 130 can access the user interface layout information from the primary mobile hub 135 and communicate the user interface layout information to the mobile device 110. In another arrangement, the cached mobile hub 130 can communicate to the primary mobile hub 135 a request to communicate the user interface layout information to the mobile device 110. In response, the primary mobile hub 135 can communicate to the mobile device 110 the user interface layout information.

The user interface layout information can define a user interface layout of another mobile device 115 used by the user, for example a user interface layout customized by the user. Such other mobile device 115 can be configured to synchronize the user interface layout information with the primary mobile hub 135, for example responsive to the user making changes to the user interface layout or responsive to the user initiating the synchronization. The user interface layout information can be configured to be processed by other mobile devices used by the user, such as the mobile device 110, to present that same user interface layout on their respective displays. Accordingly, the user will see the same user interface layout one each of the mobile devices 110, 115. This can greatly simplify the user's experience when using different mobile devices. In this regard, the user will have icons and menu items commonly used by the user in the same place in the user interface on each of the mobile devices 110, 115 used by the user.

In a further arrangement, responsive to identifying and accessing the user profile 132, the cached mobile hub 130 can select, based on the user profile 132, one or more applications (e.g., mobile applications) associated with the user profile 132. The cached mobile hub 130 can access the application(s) from the primary mobile hub 135 and communicate the application(s), along with user configuration settings and data, if any, to the mobile device 110. In another arrangement, the mobile device 110 can directly access the primary mobile hub 135 to access and receive the application(s), configuration settings and data to the mobile device 110. For example, the user profile 132 can indicate the primary mobile hub 135 assigned to the user, and the cached mobile hub 130 can provide corresponding information to the mobile device 110.

In an arrangement in which the primary mobile hub 135 has a stored copy of an application, that copy can be communicated to the mobile device 110. In an arrangement in which the primary mobile hub 135 has a uniform resource identifier (URL) where the application can be accessed, the primary mobile hub 135 can use the URL access the application and communicate the application to the mobile device 110, or communicate the URL to the mobile device 110, which can be configured to automatically download the application, for example from another mobile hub 145 or an Internet based software store. Such other mobile hub 145 or Internet based software store, for example, can be configured for specific tasks, for example downloading applications, and thus can perform such tasks very efficiently. Responsive to receiving the applications, the mobile device 110 can install the application(s) and, optionally, configure the application(s) in accordance with the user's configuration settings for those applications. The mobile device 110 also can import any data associated with the application(s) previously generated and/or used by the user.

The applications can be applications used by the user on one or more other mobile devices, such as the mobile device 115. For example, responsive to a user installing an application on the mobile device 115, the mobile device 115 can synchronize the application with the primary mobile hub 135 to save a copy of the installed version on the primary mobile hub 135, or indicate to the primary mobile hub 135 information, such as a URL, which the primary mobile hub 135 can use to access a copy of the application. The primary mobile hub 135 also can update the user profile 132 of the user to associate the application with the user profile 132. Further, responsive to the user configuring the application and/or adding data to the application, the mobile device 115 can synchronize the user's configuration settings and/or data with the primary mobile hub 135. Similarly, when the user uninstalls an application from a mobile device 115, the mobile device 115 can indicate such with the primary mobile hub 135. In response, the primary mobile hub 135 can disassociate the application from the user profile 132 of the user and, optionally, delete the application, along with the corresponding user configuration settings and data, from the primary mobile hub 135.

Accordingly, the user will have the same applications, along with the same configurations and data, on each of the mobile devices 110, 115 used by the user. Thus, the user can seamlessly move from using one mobile device to another while having his/her applications available on each of the mobile devices 110, 115. Moreover, the applications can be automatically pre-configured by the mobile devices 110, 115 with settings and/or data unique to the user. Once the mobile device 110 is configured to establish presence on the selected mobile network 150, and configured with the user's user interface layout, applications, configurations, data, etc., the mobile device 110 can periodically communicate with the cached mobile hub 130 and/or the primary mobile hub 135 to provide updates to the user profile responsive to the user making configuration changes, installing/uninstalling applications, generating data, etc. For example, the mobile device 110 can communicate with the cached mobile hub 130 and/or the primary mobile hub 135 every minute, every two minutes, every five minutes, every ten minutes, or the like, to provide updates. The mobile device 110 also can receive updates from the cached mobile hub 130 and/or the primary mobile hub 135 in this manner (e.g., to receive updates generated by use of the mobile device 115 by the user). Accordingly, use of various network and mobile device 110 resources can be maintained at an acceptable level.

The user may have a plurality of different user profiles. In such case, responsive to the user authenticating with the cached mobile hub 130, the cached mobile hub can communicate to the mobile device 110 a listing of the different user profiles 132. The mobile device 110 can present the listing to the user and prompt the user to select a user profile 132 to use to configure the mobile device 110. Responsive to the user selecting the user profile 132, the mobile device can communicate to the cached mobile hub 130 information indicating the user's selection. The mobile networks 150 selected for use by the mobile device, as well as the user interface layout, applications, configuration settings, data etc., provided to the mobile device by the mobile hubs 130, 135, 145 can be selected to correspond to the selected user profile 132.

At some point the user may choose to change the configuration of the mobile device 110 to correspond to another user profile 132. In such case, the user can access a menu presented on the mobile device 110 to change the user profile 132. For example, the responsive to the user accessing the menu, the mobile device 110 can communicate a request to the cached mobile hub 130 asking for a listing of user profiles associated with the user. In response, the cached mobile hub 130 can communicate the listing to the mobile device 110, which the mobile device can present to the user. From the listing the mobile device can choose another user profile which, for simplicity, will be referred to as a second user profile. It should be noted, however, that the user may have any number of user profiles and the term "second user profile" does not indicate a numerical order in which user profiles are assigned to the user. The mobile device 110 can communicate information pertaining to the user selection to the cached mobile hub 130.

Responsive to receiving the user selection, the mobile device can communicate a request to the cached mobile hub 130 indicating the selected user profile. In response, the cached mobile hub 130 can identify a mobile network indicated in the second user profile as being available to the user and that satisfies at least one user specified criterion associated with the second user profile. Responsive to identifying the mobile network that satisfies that criterion/criteria, the cached mobile hub 130 can select a subscriber authentication associated with the second user profile and configured to authenticate the user with the identified mobile networks. The cached mobile hub 130 can communicate to the mobile device 110 that subscriber authentication. In response, the mobile device 110 can process the subscriber authentication to automatically establish presence on the identified mobile network.

Further, responsive to receiving the request selecting the second user profile, the cached mobile hub 130 can select the user profile can select user interface layout information associated with the second user profile. The user interface layout information can define a customized user interface layout used by the user when using the second user profile, and can be configured to be processed by the mobile device 110 to present that customized user interface layout on the display of the mobile device 110. The cached mobile hub 130 can communicate that user interface layout information to the mobile device 110. In response, the mobile device 110 can configure its user interface in accordance with the user interface layout. Moreover, responsive to receiving the request selecting the second user profile, the cached mobile hub 130 can select one or more applications associated with the second user profile and communicate those applications to the mobile device 110. Responsive to receiving the applications, the mobile device 110 can install the applications and, optionally, configure the applications in accordance with the user's configuration settings for those applications. The mobile device 110 also can import any data associated with the applications previously generated and/or used by the user.

Accordingly, the user can use different applications and user interface layouts on the same device, without need to store data for the different user interface layouts and applications on the mobile device 110. Moreover, the mobile device 110 can use on the mobile device 110 the same user interface layouts and applications used on other mobile devices, while retaining the same configuration settings and data generated on the other mobile devices.

In one scenario, a user may choose to use another person's mobile device, with that user's permission of course. The user can initiate re-configuration of that mobile device to correspond to the user's user profile 132. When the user returns the mobile device back to the owner, that person can initiate re-configuration of the mobile device again to correspond to his/her user profile. Thus, if a user loses his/her mobile device, rather than immediately purchasing a new mobile device, the user may use other users' mobile devices, with all of the user's applications, etc. and connecting to the user's mobile network(s) 150, until the user finds his/her mobile device or purchases a new mobile device.

In a further aspect of the present arrangements, the cached mobile hub 130 can monitor communications communicated between the mobile device 110 and the selected mobile network 150, for instance call and/or data characteristics, in real time. For example, the cached mobile hub 130 can establish a communication link with the selected mobile network 150, and the mobile network 150 can communicate to the cached mobile hub 130, in real time, information indicating the present level of QoS being provided to the mobile device 110 and the types of communications being sent and received by the mobile device 110 over the mobile network 150.

The cached mobile hub 130 can analyze the communications to whether the communications satisfy the user specified criteria. By way of example, assume the specified criteria indicates that the user desires to use a low cost mobile network 150, which may provide relatively low QoS, for telephone calls and a higher cost mobile network, which may provide higher QoS, for Internet browsing. If the mobile device 110 has presence established on the low cost mobile network 150, and the user currently only is using the mobile device 110 for telephone calls, the cached mobile hub 130 can determine that the communications (telephone calls) satisfy the user specified criteria for using the low cost mobile network 150. If however, the user begins to use the mobile device 110 for Internet browsing, the cached mobile hub 130 can determine that the communications (Internet browsing) do not satisfy the user specified criteria for using the low cost mobile network 150.

Responsive to determining that the communications communicated between the mobile device 110 and the presently selected mobile network 150 do not satisfy the user specified criteria, the cached mobile hub 130 can, in real time, select another mobile network 150 more suitable for the manner in which the user currently is using the mobile device 110, for example a mobile network 150 more suitable for web browsing. To do so, the cached mobile hub 130 can access the user profile 132 to identify the subscriber authentications assigned to the user, and select a subscriber authentication which is configured to authenticate the user with a mobile network 150 that provides greater bandwidth. Further the cached mobile hub 130 can communicate that subscriber authentication to the mobile device 110. That subscriber authentication can be communicated via the mobile network 150 to which the mobile device 110 is presently connected, or via the BTS 120 or wireless gateway 125. Responsive to receiving the subscriber authentication, the mobile device 110 can store the subscriber authentication to one or more memory elements in the mobile device 110 and automatically initiate connection, using the subscriber authentication, to the new mobile network 150 to establish presence on that mobile network 150. Such connection can be initiated in real time. Accordingly, the mobile device 110 can begin communicating via the new mobile network 150. Moreover, any presently active calls and/or user sessions can be maintained across the mobile networks 150, though there might be some noticeable delay due to the time it takes for the mobile device 110 to establish presence on the new mobile network 150.

Advantageously, the user need not change out a SIM card on the mobile device 110 to connect to the new mobile network 150. Indeed, the user can continue using the mobile device 110 and the mobile device 110 can, in real time, automatically change networks without any user intervention. Nonetheless, in one optional arrangement, the mobile device 110 can present a notification to the user indicating that the mobile network change is recommended, and prompt the user to accept or deny the change. If the user denies the change, the mobile device 110 can communicate corresponding information to the cached mobile hub 130, and the cached mobile hub 130 can update the user's user profile 132 accordingly and continue monitoring the communications between the mobile device 110 and the original mobile network 150. If the user accepts the change, the changeover to the new mobile network 150 can be initiated in real time.

Another advantage of the present arrangements is improved security. In an unscrupulous person were to steal one of the user's mobile devices 110, 115, that person will not be able to access the user's user profile 132. In this regard, the mobile hubs 130, 135, 145 can be configured to require a manual user authentication (e.g., using a user ID and password) for the user to make changes to the user profile. It is unlikely that other people will have such information. Moreover, responsive to the user reporting a mobile device 110, 115 being lost or stolen, the user can request a reset of the user ID. Responsive to the user ID being reset, at least one of the mobile hubs 130, 135, 145 can be configured to communicate to the mobile devices 110, 115 a command to lock the user's applications, data, configurations and other information. The new user ID can be required to unlock these items on the mobile devices 110, 115.

Figure 2:
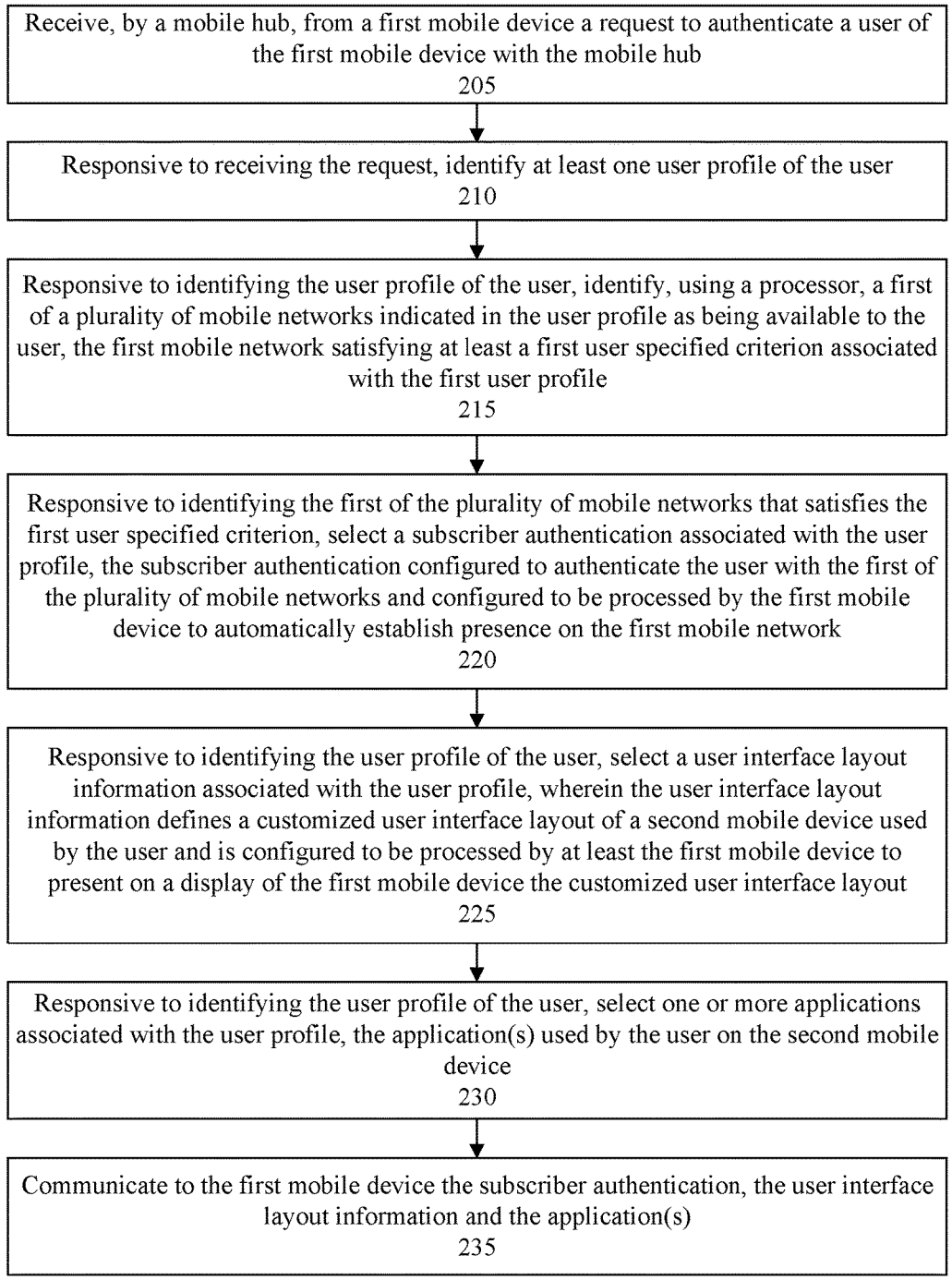
FIG. 2 is a flow chart illustrating an example of a method of communicating a subscriber authentication from a mobile hub to a mobile device.

FIG. 2 is a flow chart illustrating an example of a method 200 of communicating a subscriber authentication from a mobile hub to a mobile device. At step 205, the mobile hub can receive from a first mobile device a request to authenticate a user of the first mobile device with the mobile hub. At step 210, responsive to receiving the request, at least one user profile of the user can be identified. At step 215, responsive to identifying the user profile of the user, a first of a plurality of mobile networks indicated in the user profile as being available to the can be identified using a processor. The first mobile network can satisfy at least a first user specified criterion associated with the first user profile At step 220, responsive to identifying the first of the plurality of mobile networks that satisfies the first user specified criterion, a subscriber authentication associated with the user profile can be selected. The subscriber authentication can be configured to authenticate the user with the first of the plurality of mobile networks and configured to be processed by the first mobile device to automatically establish presence on the first mobile network. At step 225, responsive to identifying the user profile of the user, a user interface layout information associated with the user profile can be selected. The user interface layout information can define a customized user interface layout of a second mobile device used by the user and can be configured to be processed by at least the first mobile device to present on a display of the first mobile device the customized user interface layout. At step 230, responsive to identifying the user profile of the user, one or more applications associated with the user profile can be selected, the application(s) used by the user on the second mobile device. At step 235, the subscriber authentication, the user interface layout information and the application(s) can be communicated to the first mobile device.

Figure 3:
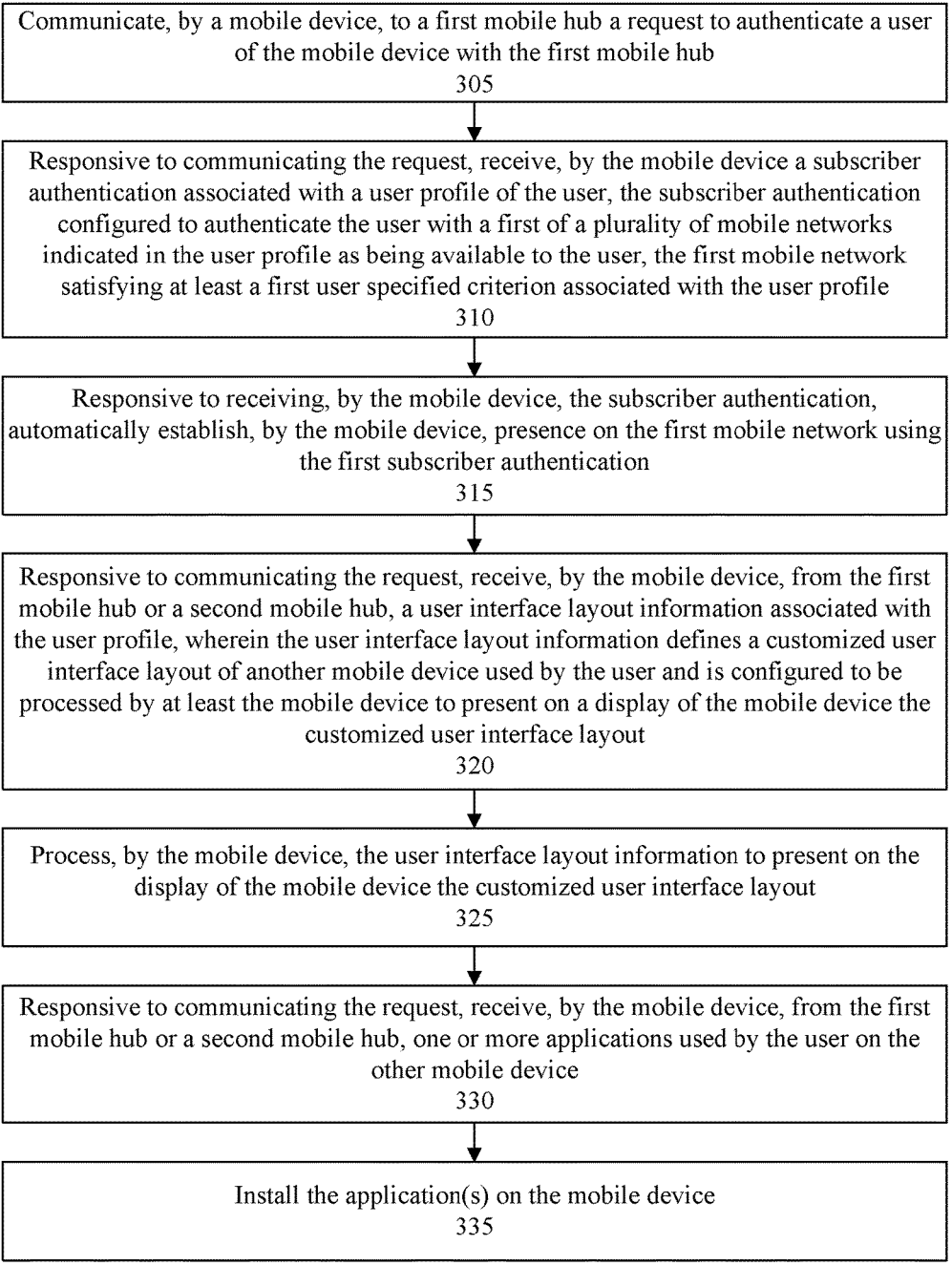
FIG. 3 is a flow chart illustrating an example of a method of automatically establishing, by a mobile device, presence on a mobile network using a subscriber authentication received from a mobile hub.

FIG. 3 is a flow chart illustrating an example of a method 300 of automatically establishing, by a mobile device, presence on a mobile network using a subscriber authentication received from a mobile hub. At step 305, a mobile device can communicate to a first mobile hub a request to authenticate a user of the mobile device with the mobile hub. At step 310, responsive to communicating the request, the mobile device can receive a subscriber authentication associated with a user profile of the user. The subscriber authentication can be configured to authenticate the user with a first of a plurality of mobile networks indicated in the user profile as being available to the user, the first mobile network satisfying at least a first user specified criterion associated with the user profile. At step 315, responsive to the mobile device receiving the subscriber authentication, the mobile device can automatically establish presence on the first mobile network using the first subscriber authentication.

At step 320, responsive to communicating the request, the mobile device can receive, from the first mobile hub or a second mobile hub, a user interface layout information associated with the user profile. The user interface layout information can define a customized user interface layout of another mobile device used by the user and can be configured to be processed by at least the mobile device to present on a display of the mobile device the customized user interface layout. At step 325, the mobile device can process the user interface layout information to present on the display of the mobile device the customized user interface layout.

At step 330, responsive to communicating the request, the mobile device can receive, from the first mobile hub or a second mobile hub, one or more applications used by the user on the other mobile device. At step 335, the application(s) can be installed on the mobile device.

Figure 4:
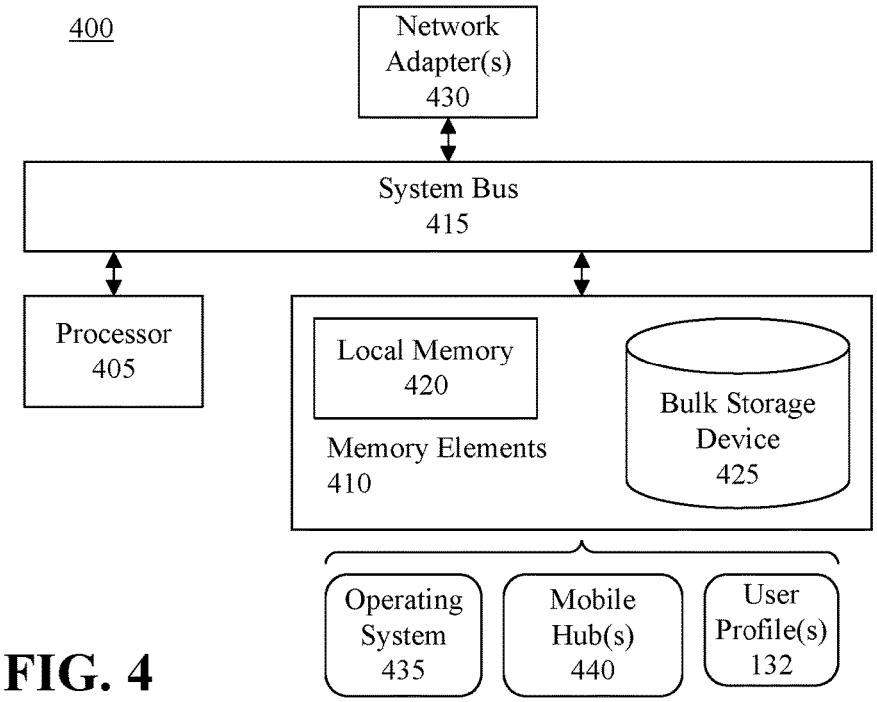
FIG. 4 is a block diagram illustrating example architecture for a data processing system that hosts a mobile hub.

FIG. 4 is a block diagram illustrating example architecture for a data processing system 400 that hosts one or more mobile hubs 440. A mobile hub 440 can be, for example, the cached mobile hub 130, the primary mobile hub 135, the connector mobile hub 140 or another mobile hub 145 of FIG. 1.

The data processing system 400 can include at least one processor 405 (e.g., a central processing unit) coupled to memory elements 410 through a system bus 415 or other suitable circuitry. As such, the data processing system 400 can store program code within the memory elements 410.

The processor 405 can execute the program code accessed from the memory elements 410 via the system bus 415. It should be appreciated that the data processing system 400 can be implemented in the form of any system including a processor and memory that is capable of performing the functions and/or operations described within this specification as being performed by a mobile hub 130-145.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 400 also can include one or more cache memories (not shown) that provide temporary storage of at least some program code in order to reduce the number of times program code must be retrieved from the bulk storage device 425 during execution.

One or more network adapters 430 can be coupled to data processing system 400 via the system bus 415 to enable the data processing system 400 to become coupled to other systems, computer systems, remote printers, and/or remote storage devices through intervening private or public networks. Modems, cable modems, transceivers, and Ethernet cards are examples of different types of network adapters 430 that can be used with the data processing system 400.

As pictured in FIG. 4, the memory elements 410 can store the components of the data processing system 400, namely an operating system 435 and a mobile hub 440. Being implemented in the form of executable program code, these components of the data processing system 400 can be executed by the data processing system 400 and, as such, can be considered part of the data processing system 400. Further, the data processing system 400 can store the user profiles 132, and user interface layout information, applications, user configurations and data associated with the user profiles. The operating system 435, mobile hub 440 and user profiles 132 are functional data structures that impart functionality when employed as part of the data processing system 400.

Figure 5:
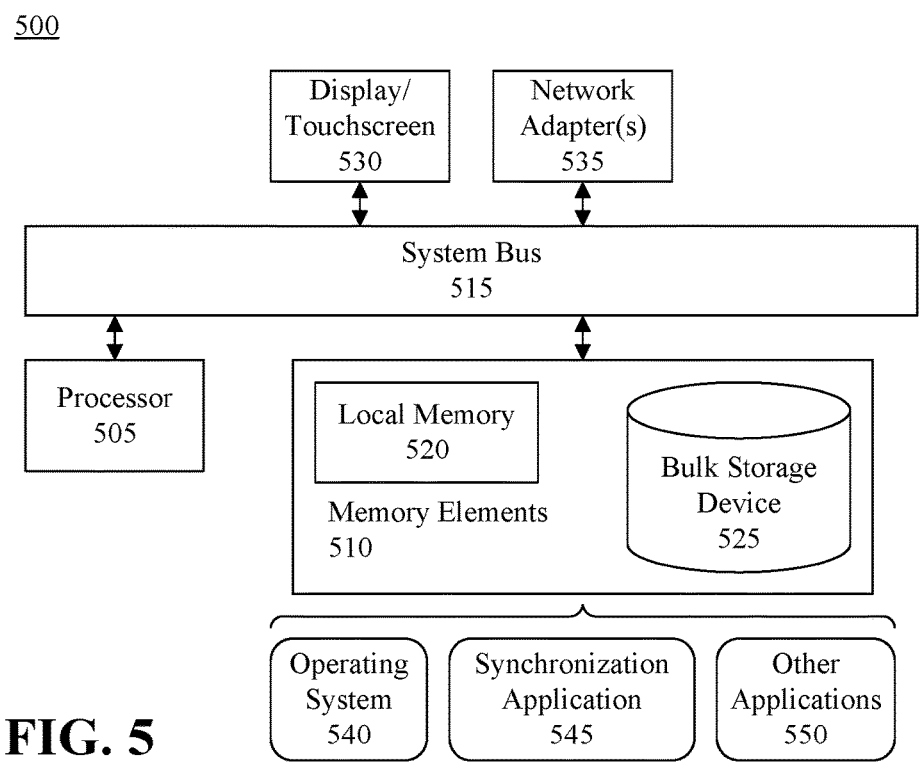
FIG. 5 is a block diagram illustrating example architecture for a mobile device.

FIG. 5 is a block diagram illustrating example architecture for a mobile device 500, such as the mobile device 110 or the mobile device 115 of FIG. 1. The mobile device 500 can include at least one processor 505 (e.g., a central processing unit) coupled to memory elements 510 through a system bus 515 or other suitable circuitry. As such, the mobile device 500 can store program code within the memory elements 510. The processor 505 can execute the program code accessed from the memory elements 510 via the system bus 515. It should be appreciated that the mobile device 500 can be implemented in the form of any system including a processor and memory that is capable of performing the functions and/or operations described within this specification as being performed by one or more of the mobile devices 110, 115.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a HDD, SSD, or other persistent data storage device. The mobile device 500 also can include one or more cache memories (not shown) that provide temporary storage of at least some program code in order to reduce the number of times program code must be retrieved from the bulk storage device 525 during execution.

Input/output (I/O) devices such as a display and/or touchscreen 530 can be coupled to the mobile device 500. One or more pointing devices (not shown) also can be coupled to the mobile device 500. The I/O devices can be coupled to the mobile device 500 either directly or through intervening I/O controllers. For example, the display/touchscreen 530 can be coupled to the mobile device 500 via a graphics processing unit (GPU), which may be a component of the processor 505 or a discrete device. One or more wireless network adapters 535 also can be coupled to mobile device 500 to enable the mobile device 500 to become coupled to other systems, computer systems, remote printers, and/or remote storage devices through intervening private or public networks. For example, the mobile device 500 can include a wireless network adapter 535 configured to communicate in accordance with one or more of the IEEE 802 communication protocols. The mobile device also can include a wireless network adapter 535 configured to communicate in accordance with one or more cellular communication protocols, for example GSM, CDMA, LTE, 3G, 4G, etc.

As pictured in FIG. 5, the memory elements 510 can store the components of the mobile device 500, namely an operating system 540, an synchronization application 545 and one or more other applications 550 (e.g., mobile applications). Being implemented in the form of executable program code, these components of the mobile device 500 can be executed by the mobile device 500 and, as such, can be considered part of the mobile device 500. Moreover, the operating system 540, synchronization application 545 and other applications 550 are functional data structures that impart functionality when employed as part of the mobile device 500 of FIG. 5.

The synchronization application 545 can be configured to perform the processes described herein that are performed by the mobile devices 110, 115, for example in accordance with the method 300 of FIG. 3. The synchronization application 545 also can synchronize user profile data, application data, configuration settings, etc. with the mobile hubs described in FIG. 1. The other applications 550 can include applications received from one or more mobile hubs and installed on the mobile device 500.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
receiving, by a mobile hub, from a first mobile device a first request to authenticate a user of the first mobile device with the mobile hub;
responsive to receiving the first request, identifying at least a first user profile of the user stored on the mobile hub;
responsive to identifying the first user profile of the user, identifying a first of a plurality of mobile networks indicated in the first user profile as being available to the user, the first mobile network satisfying at least a first user specified criterion associated with the first user profile;
responsive to identifying the first of the plurality of mobile networks that satisfies the first user specified criterion, selecting a first subscriber authentication associated with the first user profile, the first subscriber authentication configured to authenticate the user with the first of the plurality of mobile networks and configured to be processed by the first mobile device to automatically establish presence on the first mobile network; and communicating to the first mobile device the first subscriber authentication.

2. The system of claim 1, the executable operations further comprising:

monitoring, by the mobile hub, communications communicated between the first mobile device and the first mobile network;

determining, by the mobile hub, whether the communications communicated between the first mobile device and the first mobile network satisfy the first user specified criterion;

responsive to determining that the communications communicated between the first mobile device and the first mobile network do not satisfy the first user specified criterion, selecting a second subscriber authentication associated with the first user profile, the second subscriber authentication configured to authenticate the user with a second of the plurality of mobile networks and configured to be processed by the first mobile device to automatically establish presence on the second mobile network; and communicating to the first mobile device the second subscriber authentication.

3. The system of claim 1, the executable operations further comprising:

receiving, by the mobile hub, from the first mobile device at least a second request selecting a second user profile;

responsive to receiving the second request selecting the second user profile, identifying a second of the plurality of mobile networks indicated in the second user profile as being available to the user and that satisfies at least a second user specified criterion associated with the second user profile;

responsive to identifying the second of the plurality of mobile networks that satisfies the second user specified criterion, selecting a second subscriber authentication associated with the second user profile, the second subscriber authentication configured to authenticate the user with the second of the plurality of mobile networks and configured to be processed by the first mobile device to automatically establish presence on the second mobile network; and communicating to the first mobile device the second subscriber authentication.

4. The system of claim 1, the executable operations further comprising:

responsive to identifying the first user profile of the user, selecting a first user interface layout information associated with the first user profile, wherein the first user interface layout information defines a first customized user interface layout of a second mobile device used by the user and is configured to be processed by at least the first mobile device to present on a display of the first mobile device the first customized user interface layout; and communicating to the first mobile device the first user interface layout information associated with the first user profile.

5. The system of claim 4, the executable operations further comprising:

receiving, by the mobile hub, from the first mobile device at least a second request selecting a second user profile;

responsive to receiving the second request selecting the second user profile, selecting a second user interface layout information associated with the second user profile, wherein the second user interface layout information defines a second customized user interface layout used by the user and is configured to be processed by at least the first mobile device to present on the display of the first mobile device the second customized user interface layout; and communicating to the first mobile device the second user interface layout information associated with the second user profile.

6. The system of claim 1, the executable operations further comprising:

responsive to identifying the first user profile of the user, selecting at least a first application associated with the first user profile, the first application used by the user on a second mobile device; and communicating to the first mobile device the first application associated with the first user profile.

7. The system of claim 6, the executable operations further comprising:

receiving, by the mobile hub, from the first mobile device at least a second request selecting a second user profile;

responsive to receiving the second request selecting the second user profile, selecting at least a second application associated with the second user profile; and communicating to the first mobile device the second application associated with the second user profile.

8. A computer program product comprising a computer readable storage medium having program code stored thereon, the program code executable by a processor to perform a method comprising:

receiving, by a mobile hub, from a first mobile device a first request to authenticate a user of the first mobile device with the mobile hub;

responsive to receiving the first request, identifying at least a first user profile of the user stored on the mobile hub;

responsive to identifying the first user profile of the user, identifying, by the processor, a first of a plurality of mobile networks indicated in the first user profile as being available to the user, the first mobile network satisfying at least a first user specified criterion associated with the first user profile;

responsive to identifying the first of the plurality of mobile networks that satisfies the first user specified criterion, selecting a first subscriber authentication associated with the first user profile, the first subscriber authentication configured to authenticate the user with the first of the plurality of mobile networks and configured to be processed by the first mobile device to automatically establish presence on the first mobile network; and communicating to the first mobile device the first subscriber authentication.

9. The computer program product of claim 8, the method further comprising:

monitoring, by the mobile hub, communications communicated between the first mobile device and the first mobile network;

determining, by the mobile hub, whether the communications communicated between the first mobile device and the first mobile network satisfy the first user specified criterion;

responsive to determining that the communications communicated between the first mobile device and the first mobile network do not satisfy the first user specified criterion, selecting a second subscriber authentication associated with the first user profile, the second subscriber authentication configured to authenticate the user with a second of the plurality of mobile networks and configured to be processed by the first mobile device to automatically establish presence on the second mobile network; and communicating to the first mobile device the second subscriber authentication.

10. The computer program product of claim 8, the method further comprising:

receiving, by the mobile hub, from the first mobile device at least a second request selecting a second user profile;

responsive to receiving the second request selecting the second user profile, identifying a second of the plurality of mobile networks indicated in the second user profile as being available to the user and that satisfies at least a second user specified criterion associated with the second user profile;

responsive to identifying the second of the plurality of mobile networks that satisfies the second user specified criterion, selecting a second subscriber authentication associated with the second user profile, the second subscriber authentication configured to authenticate the user with the second of the plurality of mobile networks and configured to be processed by the first mobile device to automatically establish presence on the second mobile network; and communicating to the first mobile device the second subscriber authentication.

11. The computer program product of claim 8, the method further comprising:

responsive to identifying the first user profile of the user, selecting a first user interface layout information associated with the first user profile, wherein the first user interface layout information defines a first customized user interface layout of a second mobile device used by the user and is configured to be processed by at least the first mobile device to present on a display of the first mobile device the first customized user interface layout; and communicating to the first mobile device the first user interface layout information associated with the first user profile.

12. The computer program product of claim 11, the method further comprising:

receiving, by the mobile hub, from the first mobile device at least a second request selecting a second user profile;

responsive to receiving the second request selecting the second user profile, selecting a second user interface layout information associated with the second user profile, wherein the second user interface layout information defines a second customized user interface layout used by the user and is configured to be processed by at least the first mobile device to present on the display of the first mobile device the second customized user interface layout; and communicating to the first mobile device the second user interface layout information associated with the second user profile.

13. The computer program product of claim 8, the method further comprising:

responsive to identifying the first user profile of the user, selecting at least a first application associated with the first user profile, the first application used by the user on a second mobile device; and communicating to the first mobile device the first application associated with the first user profile.

14. The computer program product of claim 13, the method further comprising:

receiving, by the mobile hub, from the first mobile device at least a second request selecting a second user profile;

responsive to receiving the second request selecting the second user profile, selecting at least a second application associated with the second user profile; and communicating to the first mobile device the second application associated with the second user profile.

15. A computer program product comprising a computer readable storage medium having program code stored thereon, the program code executable by a processor to perform a method comprising:

communicating, by a mobile device comprising at least one processor, to a first mobile hub a request to authenticate a user of the mobile device with the first mobile hub;

responsive to communicating the request, receiving, by the mobile device a subscriber authentication associated with a user profile of the user stored on the mobile hub, the subscriber authentication configured to authenticate the user with a first of a plurality of mobile networks indicated in the user profile as being available to the user, the first mobile network satisfying at least a first user specified criterion associated with the user profile; and responsive to receiving, by the mobile device, the subscriber authentication, automatically establishing, by the mobile device, presence on the first mobile network using the first subscriber authentication.

16. The computer program product of claim 15, the method further comprising:

responsive to communicating the request, receiving, by the mobile device, from the first mobile hub or a second mobile hub, a user interface layout information associated with the user profile, wherein the user interface layout information defines a customized user interface layout of another mobile device used by the user and is configured to be processed by at least the mobile device to present on a display of the mobile device the customized user interface layout; and processing, by the mobile device, the user interface layout information to present on the display of the mobile device the customized user interface layout.

17. The computer program product of claim 15, the method further comprising:

responsive to communicating the request, receiving, by the mobile device, from the first mobile hub or a second mobile hub, at least one application used by the user on another mobile device; and installing the at least one application on the mobile device.

18. The computer program product of claim 17, the method further comprising:

responsive to communicating the request, receiving, by the mobile device, from the first mobile hub or a second mobile hub, configuration settings for the at least one application; and configuring the at least one application in accordance with the configuration settings.

19. The computer program product of claim 18, wherein the configuration settings are configuration settings of the user.

20. The computer program product of claim 17, the method further comprising:
    importing, by the mobile device, data associated with the at least one application previously generated by the user or previously used by the user.

\* \* \* \* \*